May 16, 1933.  G. BLACKSTOCK  1,909,608
CHANGE GEAR DEVICE
Filed Feb. 13, 1930  6 Sheets-Sheet 1

INVENTOR
G. BLACKSTOCK
BY
ATTORNEYS.

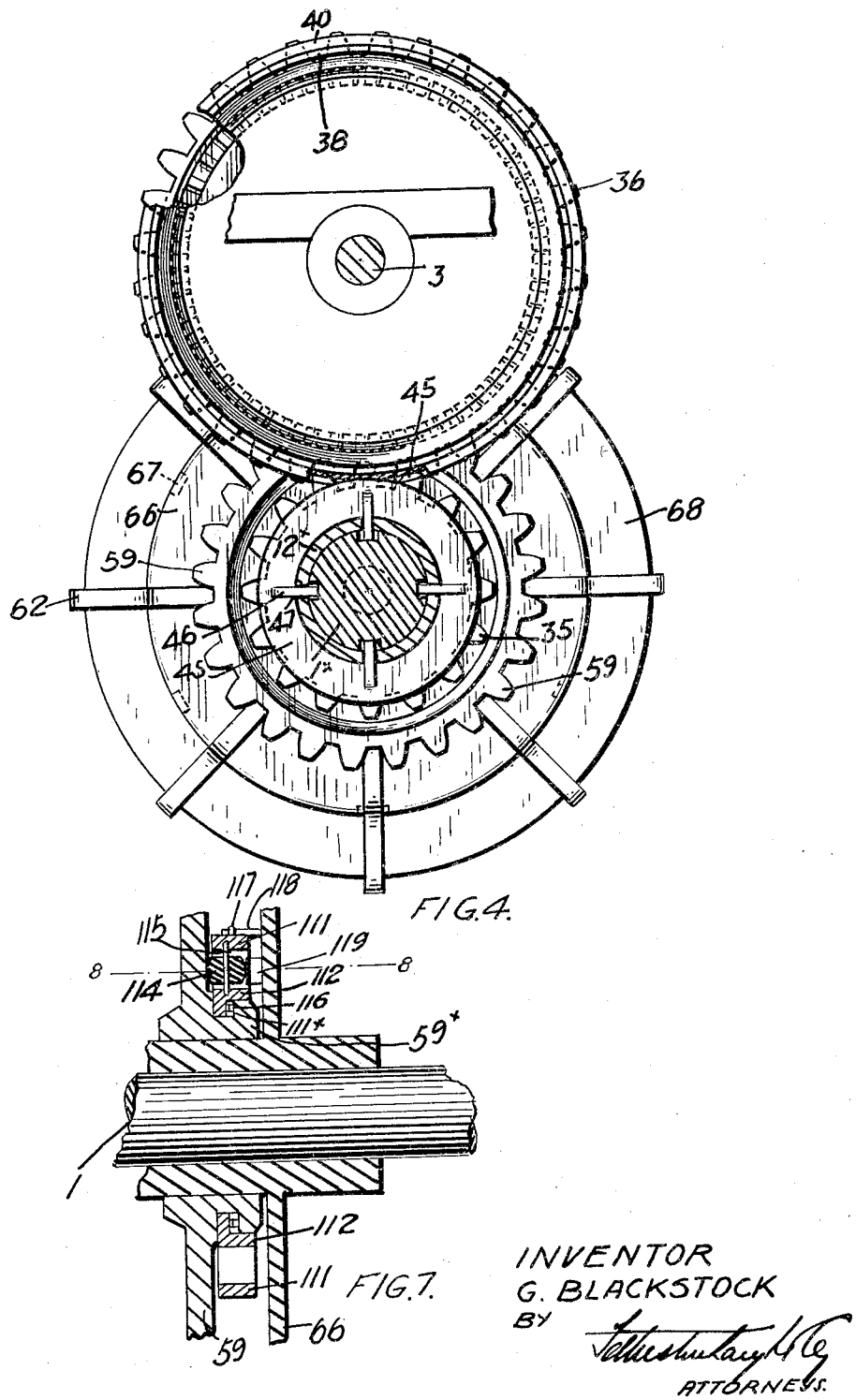

May 16, 1933.  G. BLACKSTOCK  1,909,608
CHANGE GEAR DEVICE
Filed Feb. 13, 1930  6 Sheets-Sheet 4
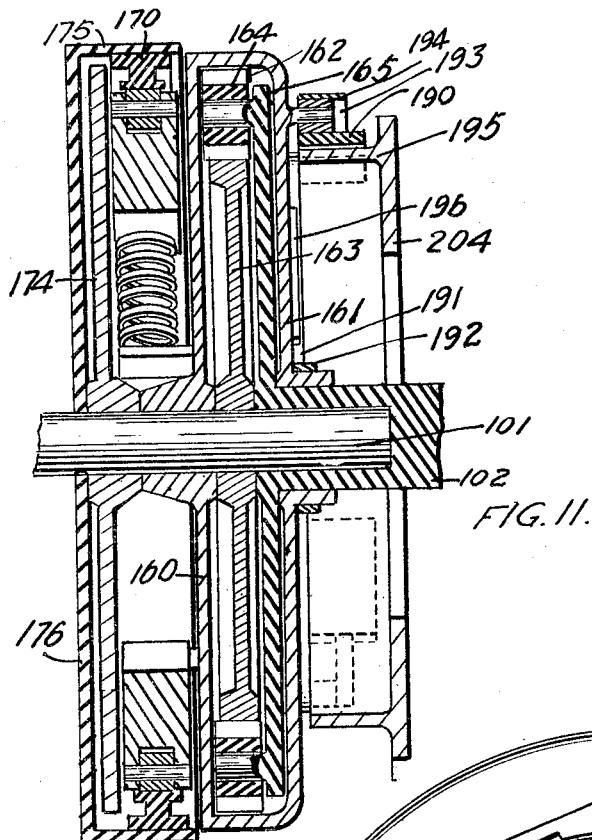
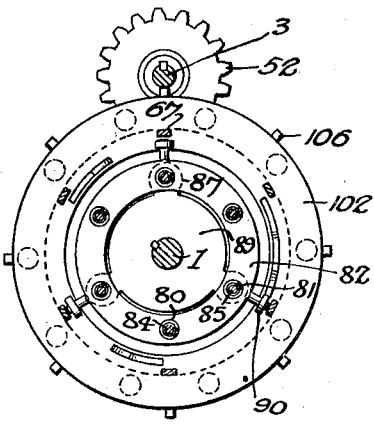
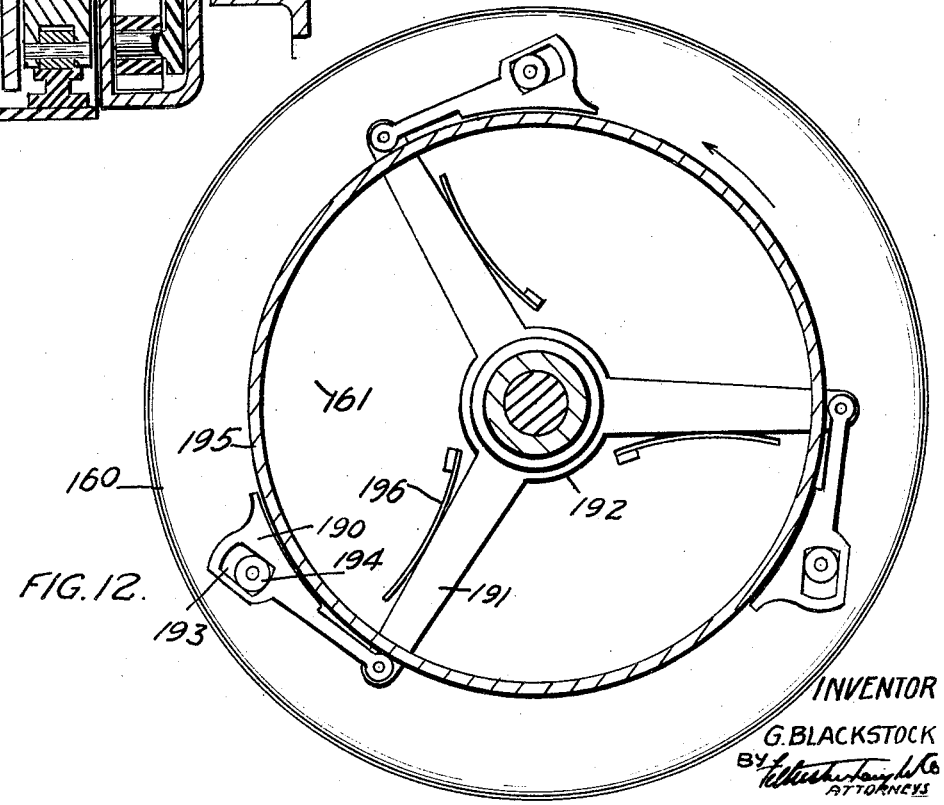
INVENTOR
G. BLACKSTOCK
BY
ATTORNEYS

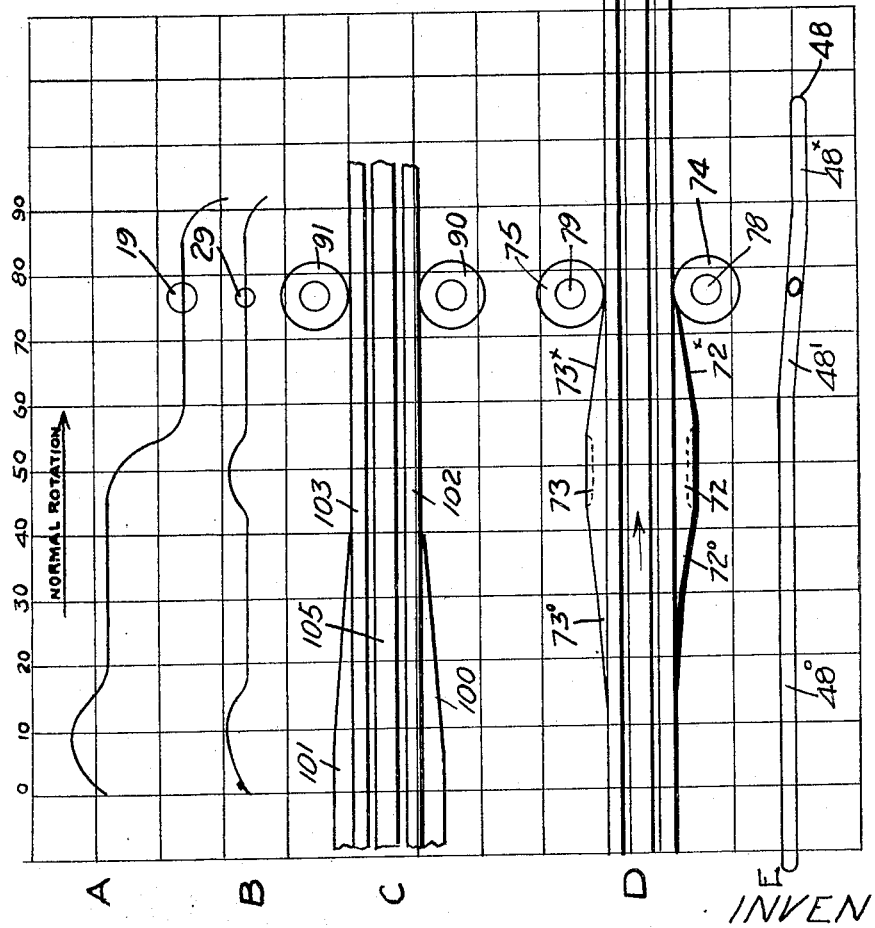
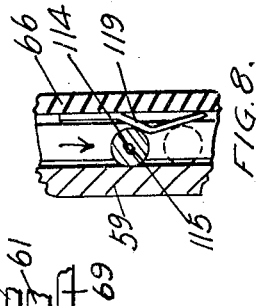

May 16, 1933.   G. BLACKSTOCK   1,909,608
CHANGE GEAR DEVICE
Filed Feb. 13, 1930   6 Sheets-Sheet 6

INVENTOR
G. BLACKSTOCK
BY
ATTORNEYS.

Patented May 16, 1933

1,909,608

UNITED STATES PATENT OFFICE

GIBBS BLACKSTOCK, OF TORONTO, ONTARIO, CANADA

CHANGE GEAR DEVICE

Application filed February 13, 1930. Serial No. 428,196.

My invention relates to improvements in change gear devices of the type disclosed in my Patent No. 1,877,383, granted Sept. 13, 1932, which consists of a drive and driven shaft and a plurality of driving connections differing in driving ratio therebetween, and the object of the invention is to enable the employment of a friction clutch mechanism in each of said connections, operable by overload overcoming centrifugal action to effect change to a lower ratio, and to a higher ratio when the drive shaft is subject to engine drag, and it consists essentially of the arrangement and construction of parts hereinafter more particularly explained.

Fig. 1 is a sectional view through my device and showing a three speed drive machine.

Fig. 1ª is a detail view of the reversing mechanism.

Fig. 4 is a sectional view on line 4—4 Fig. 1.

Fig. 6 is a sectional view on line 6—6 Fig. 1.

Fig. 7 is an enlarged sectional detail of a supplemental engagement device indicated in Fig. 1.

Fig. 8 is a sectional plan view of the parts shown in Fig. 7, on line 8—8 in this figure.

Fig. 9 is a sectional view through a fragmentary portion of the engagement teeth forming part of the low gear connection.

Fig. 10 is a chart showing the relative motion of the various parts of the device.

Figure 1:
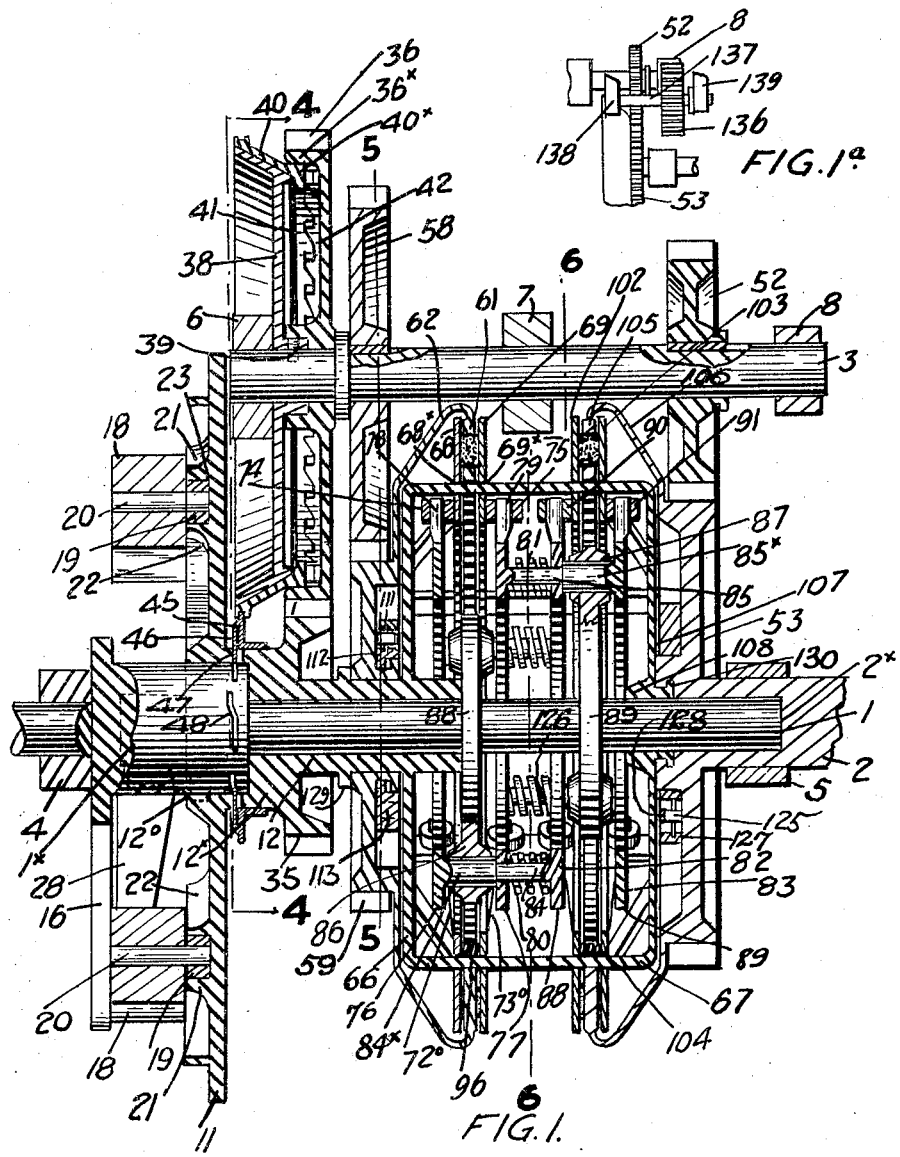

Fig. 11 to 16 inclusive show the friction clutch principle applied to a two speed change gear device.

In the drawings like characters of reference indicate corresponding parts in each figure.

1 is a driving shaft mounted at its outer end in a bearing 4. 2 is a driven shaft mounted in a bearing 5 and provided with a bearing orifice $2^x$ extending axially thereof and into which the opposite or inner end of the driving shaft turnably fits to serve as a bearing for such end. 11 is a disc forming part of a floating member provided with a sleeve 12 freely mounted upon the driving shaft 1.

The sleeve 12 is formed with an enlargement $12^x$ formed integral with the sleeve 12 and disc 11 and in which is formed a recess $12°$. The sleeve 12, disc 11 and parts carried thereby together form the floating member. The driving shaft 1 is provided with an enlargement $1^x$ fitting within the recess $12°$. 16 is a cross arm secured to or formed integral with the enlarged portion $1^x$ of the driving shaft, the arm being provided at its extremities with studs 17 on which are swung weights 18. 20 are stud shafts or shafts formed integral with the rollers 19 which are mounted in the weights and are preferably carried on anti-friction bearings therein on which are journalled rollers 19 (the path of travel of which is indicated at A in the chart Fig. 10).

21 are strong curved flanges extending from the face of the disc 11 and 22 are comparatively thin flanges opposing the aforesaid flanges 21 and spaced therefrom to form interposed guideways 23 in which the rollers 19 travel, the travel being limited by the end wall portion $21^x$ and $21°$ forming the ends of the guideways 23 and connecting the walls 21 and 22 together. The cross arms 16 are also provided with studs 27 on which are swung arms 28 carrying rollers 29 suitably journalled thereon, such rollers being pressed outward by strong springs 30 bearing against the free ends of the arms 28 so as to force the rollers 29 outward against flanges 31 extending from the face of the disc 11.

The angular freedom of the floating member is controlled by the length of the guideways 23, which as indicated in the drawings, is about 90°, which of course is not an arbitrary dimension and may be altered at the discretion of the designer.

The drive shaft is also shown as being advanced about 77° from its extreme backward position with respect to the floating member. The floating member and the parts coacting therewith, as above described, coact with all the gear trains, that is the low, intermediate and high gear trains to actuate them when the required conditions for actuating them are fulfilled.

The chart Fig. 10, illustrates diagrammatically the action of the weights, springs and clutches as the floating member undergoes angular displacement.

I will first describe the low gear train and its operation.

When the drive shaft begins to move, the rollers 19 travel to the forward (to the right in Fig. 2) ends of the slots 23 and the rollers 29 advance correspondingly, the disc 11 being thus forced to revolve and with it the sleeve 12.

35 is a gear which is secured to or formed integral with the sleeve 12 and revolves therewith to drive the gear 36 which is mounted freely on a counter shaft 3. The counter shaft 3 is mounted in bearings 6, 7 and 8. 38 is a cone clutch member which is secured to the counter shaft 3 or formed integral therewith as indicated at 39. 40 is a cone clutch member provided with a cylindrical portion $40^x$ which fits within the rim $36^x$ of the gear 36 so as to revolve with some freedom therein. The gear 36 is provided with an annular series of wedge like projections 42 interengaging with opposing wedge like projections 41 carried by the clutch member 40 so that the inclined or wedge face of the projections 42 and 41 are in bearing contact.

45 is a spring disc, the upper peripheral portion of which fits within an annular groove $45^x$ extending around the exterior periphery of the cone clutch member 40. The spring disc member 45 may be free or splined on the sleeve 12 and is provided with spring fingers 46 which extend radially through slots 47 formed in the enlarged portion $12^x$ of the sleeve 12 into the recess $12^o$ so as to enter peculiar formed slots 48 formed in the enlarged portion $1^x$ of the driving shaft 1.

As clearly seen at E in Fig. 10, each of the slots 48 consist of circumferential portions $48^x$ and $48^o$ offset slightly one from the other and connected by an inclined portion $48^1$. When the drive shaft is advanced, that is when the rollers 19 in Fig. 2 or in Fig. 10, are toward the right or forward end of the guideway 23 the groove 48 illustrated at E in the chart holds the finger 46 and the disc 45 to the front, that is towards the left in Fig. 1 and down as indicated at A in the chart Fig. 10, which holds the cone member 40 in contact with the cone member 38, since the rim of the disc 45 works as above described in a groove $45^x$ of the cone member 40.

In the chart Fig. 10, the groove 48 is reversed and lengthened as indicated at E to make it diagrammatically consistent with the paths of the travel of the mechanism indicated thereabove. When the gear 36 and wedge projections 42 carried thereon move, the latter acting on the wedges 41 carried by the cone member 40 force the cone members 40 and 38 together so that they cannot slip, the wedge angles being sufficiently small being chosen with reference to the cone angle and the coefficient of friction of the cone surfaces. Thus the cone member 38 and counter shaft to which it is secured are forced to revolve, the drive being transmitted when the car is in motion to the driven shaft by the spline gear 52 carried upon the counter shaft 3 meshing with the gear 53 secured to the driven shaft.

The outward thrust of the rollers 19 and 29 due to centrifugal force and spring pressure produces a forward thrust on the inwardly curved flanges 21 and 31 so that the rollers take a position where this forward thrust balances the reaction due to load. The intermediate and high gear clutch members, it will of course be understood and as will hereinafter be described, are now open that is free of even slipping contact. If the engine is throttled slightly the rollers 19 and 29 will move to the left or recede. When the load is zero they will take positions say near 80° in the chart where the flanges are concentric with the centre of rotation.

If the load becomes negative, that is if the engine drags, the clutch can slip under the pressure of the fingers 46, the wedges not being able to transmit the negative load. When the drive passes to another gear train the clutch is opened completely as will appear later, but if the throttle is reopened before the next gear train is connected the clutch will jam again and take the drive.

I will now describe the intermediate gear train and its operation.

58 is a gear secured to the counter shaft 3. 59 is a gear freely mounted on the sleeve 12 of the floating member and in mesh with the gear 58. 61 is an annular driven clutch plate connected by a web or spokes 62 to the gear 59. 66 is a disc secured to the sleeve 12 of the floating member. 67 are rods extending from the plate 66. 68 and 69 are annular drive clutch plates opposing each face of the driven clutch plate 61 and provided with orifices $68^x$ and $69^x$ through which the rods 67 extend thereby allowing a certain amount of axial freedom of movement.

Referring more particularly to Fig. 10 and to the clutch plates 68 and 69 illustrated therein, 72 and 73 are cam projections extending from the outer face of each plate 68 and 69 provided at their ends with inclined portions 72ˣ and 72°, 73ˣ and 73° extending from the top of each projection to the surface of the clutch plate. 76 and 77 are ring members located at each side of the plates 68 and 69 and provided with radially projecting stud shafts 78 and 79 upon which are mounted cam rollers 74 and 75 which bear normally against the outer face of each cam plate 68 and 69.

The rings 76 and 77 merely act as carriers for the rollers 74 and 75 and are not clutch plates.

82 and 83 are ring members which are similar to the ring members 76 and 77 which serve to carry the high gear clutch rollers hereinafter described. 84 are rods which pass freely through the ring member 77 and are connected to or formed integral with the ring members 76 and 82. Each rod 84 is provided with an enlargement 84ˣ extending between the ring members 76 and 77 so as to definitely space them apart.

80 are compression springs surrounding the rods 84 between the ring members 77 and 82 resiliently holding these members apart. 85 are rods similar to the rods 84, the rods 85 extending freely through the ring member 82 and provided with an enlargement 85ˣ extending between the ring members 82 and 83 to hold them in a definite spaced relation. 81 are compression springs similar to the springs 80 and surounding the rods 85 between the ring members 77 and 82 resiliently holding these members apart. 88 and 89 are carrying members secured to the drive shaft 1 and provided with bearings 86 and 87 in which the rods 84 and 85 are carried. In this way the clutch rollers 74 and 75 and similar rollers 90 and 91 hereinafter more particularly referred to are carried with the drive shaft. The drive, however, is transmitted to the floating member parts 12, 66 and 67 to the plates 68 and 69, the relative motion of the rollers 74 and 75 being used to actuate the release and engagement of the plates 68 and 69 with the plate 61.

If the engine is throttled deliberately so that it drags, the low gear clutch formed by the cones 38 and 40 is held in slipping contact under the moderate pressure of the springs 46 so that the rotating driven shaft gives a forward pull on the floating member transmitted through the clutch members 40 and 38, the rollers 19 and 29 then appearing to move backward relative to the disc 11. The clutch rollers 74 and 75 will similarly recede since they, like the driving clutch rollers 19 and 29, are connected to the drive shaft so as to move therewith.

The receding movement of the rollers 74 and 75 carry them into engagement with the inclined portions 72ˣ and 73ˣ of the cam projections 72 and 73, this taking place while the low gear clutch is still in slipping contact. When this operation takes place the plate 61 is revolving at say twice the driven shaft speed yet revolving more slowly in the direction of arrow (see Fig. 10) than the driving plates 68 and 69 so that it tends to pull the latter, that is the plates 68 and 69, backward carrying the projections 72 and 73 from between the rollers 74 and 75 thereby freeing the intermediate clutch sufficiently to prevent the plates 68 and 69 from gripping positively until the parts synchronize together. When not in use they are separated by weak springs 96, thus the second gear clutch tends to slow the floating member which carries the plates 68 and 69 while the low gear clutch tends to make it retain its original speed and between the two it roughly keeps pace with the driving shaft while the latter is being slowed. However, when the speed of the drive shaft falls below that of the plate 61, the latter tends to carry the cams 72 and 73 between the rollers 74 and 75 and since the angle of the cam surface is relatively small this will occur without slip. When the rollers 74 and 75 have passed over about half of the inclined cam surface the plates 68 and 69 are in contact with the plate 61 the rollers being forced apart as they ride farther to the left (see Fig. 10).

Referring to Fig. 1 it is seen that the rollers 74 and the members 76, 84 and 82 move axially to the left while the rollers 75 and members 77, 85 and 83 move axially to the right (the bearings 86 and 87 allowing this motion so that all the clutch springs 80 and 81, already kept under high compression, come fully into play at once). As the rollers 74 and 75 move backward the rollers 19 and 29 move with them as clearly illustrated in the chart Fig. 10.

When the rollers 19 pass to the 60° position they and the weights move outward owing to the contour of the flanges 21, while at the same time, the spring pressed rollers 29 move into the bowed portions of the flanges 31 (if the throttling is continued the drive will pass on to the high gear connection as hereinafter described). If the throttle is now reopened the forward thrust of the drive shaft and rollers 19 is taken by the inwardly turned portions of the flanges 21 between the 45° and 55° positions (see Fig. 10). Between these positions the flange 31 is also curved inward, thus the centrifugal and spring forces combine to resist the relative forward motion of the drive shaft. As long as these forces are great enough to prevent the rollers 19 and 29 from advancing past the steepest parts of the flanges at about the 55° position, the floating member will be driven by the drive shaft and the clutch 61, 68 and 69 held by the full pressure of the springs 80 and 81.

Owing to the shape of the groove 48 cut in the drive shaft and clearly illustrated at E in Fig. 10, the spring tongues 46 are now moved to the rear that is upward in the chart and to the right in Fig. 1, while the disc 45 moving with them pushes the cone 40 free of the cone 38 so that there is no more slipping contact.

When, owing to the increase of load or decrease of speed (and of centrifugal force of the weights 18) or both, the rollers 19 and 29 are forced inward and forward past the steepest point at the 55° positions, the drive shaft and rollers 74 and 75 advance.

The rollers 74 and 75 then move clear of the cam projections 72 and 73 releasing the plates 68 and 69. The engine then races being free of the load.

The relative advance of the drive shaft and groove 48 forces the cone 40 into spring pressed contact with the cone 38 and this contact combines with the thrust of the rollers 19 and 29 on the inwardly turned parts of the flanges 21 and 31 at their forward or right hand ends to give the required acceleration to the floating member. The plates 68 and 69 are now held apart by the weak springs 96. As soon as the drive shaft reaches the speed corresponding to low gear operation the wedges 41 and 42 jam the cones 38 and 40 into positive grip and the low gear drive is taken up without lurch or shock.

Supposing the intermediate gear 61, 68 and 69 to be engaged and the rollers 74, 75, 19 and 29 between the 45° and 55° position, and the throttle to be then eased slightly so that there is a slight drag of the engine, the rollers 29 will be caught by the curved part of the flanges 31 at about the 45° position, and unless the drag is quite pronounced the engine will be driven by the drive shaft. The clutch then remains fully engaged and is not released every time the throttle is eased.

I will now describe the high gear operation.

If when the intermediate gear is in engaged (the throttling is continued or) the throttling is sufficiently deliberate or the drag is sufficiently pronounced, the rollers 29 are forced inward compressing the springs 30 and the drive shaft is retarded with respect to the floating members 11 and 12 etc. This means that the rollers 19, 29 and 74, 75 all move backward and as can be seen from part D in the chart, the latter rollers move along the slopes of the cams 72 and 73 to the left from the 45° position so that the springs 80 and 81 relax.

At the same time the rollers 90 and 91 move on to the cams 100 and 101 on the high gear clutch plates 102 and 103 bringing them together against the weak springs 104 into contact with the driven plate 105 which is secured to the gear 53 by the web or spokes 106 and thus to the driven shaft. The plates 102 and 103 are carried on the rods 67, which for steadiness are secured to a disc 107 whose hub 108 is freely mounted on the drive shaft.

When the rollers 74, 75, 90 and 91 are at about the 30° position the plates of both clutches are in contact, but the very strong springs 80 and 81 are pressing on the shoulders of the enlarged parts of the rods 84 and 85 not on the plates. To obtain this effect of contact without compression of the clutch springs it is necessary to have auxiliary springs of only moderate strength or some contrivance such as resilient facings or pads on the plates.

A simple method is to have resilient compressible inserts in the driven plates 61 and 105 projecting so far that when the clutches are open the inserts just clear the driving plates and when they are completely engaged are compressed within the plate which carries them.

With the rollers all in the 30° position both clutches will be slipping under reduced pressure, and the floating member carrying the driving plates, will share the speed of the drive shaft. This is so because, if the rollers move to the right, the second gear clutch will grip more tightly (D in chart) and the plate 61 which is moving faster than the drive shaft (carrying the rollers 74 and 75) will pull the plates 68 and 69 to the right, causing relative motion of the rollers to the left.

The rollers 90 and 91 and cams 100 and 101 act in similar fashion, the two sets between them holding the drive shaft and the floating member together at the relative position of 30° approximately.

This slipping need have only short duration; the fact that there is a definite tug or drag needed to release the second gear clutch means that the engine has been throttled considerably and will rapidly fall to the speed of the driven shaft, when the high gear clutch will engage fully and the other release, unless the throttle is reopened too soon, when the rollers 74 and 75 will return over the cams 72 and 73 closing the second gear clutch again when the speed of the plate 61 is reached.

If the throttling is prolonged until the speed of the drive shaft and floating member, and plates 102 and 103 falls below that of the driven plate 105, the relative forward motion of the last named forces the cams 100 and 101 between the rollers 90 and 91 compressing the clutch springs 80 and 81. As this takes place the rollers 19 and 29 move backward and outward into the bowed portions of the flanges 21 and 31 and the rollers 74 and 75 move clear of the cams 72 and 73 the plates 68 and 69 then moving apart clear of the plate 61.

When the throttle is reopened the drive is transmitted through the high gear connection, the rollers 19 and 29 take positions on the inwardly turned portions of the flanges 21 and 31 where the total forward thrust due to their outward pressures balances the load. When the load becomes great enough the driving rollers are forced inward and forward past the steepest points on the flanges, at about the 16° or 17° positions into positions for effecting high gear release.

As the rollers move forward the high gear clutch is released (C in the chart) and the second gear clutch partially closed as the rollers 74 and 75 run on to the cams 72 and 73. The engine, now free of load, races and the acceleration is conveyed to the floating member in this manner:—

The rollers 74 and 75 flying forward, tend to pinch the second gear cluth plates together, while the plate 61, going at say twice the speed of the driven shaft, is still faster than the drive shaft, the floating member thus being really accelerated from the driven parts. As soon as the drive shaft overtakes the plate 61 the rollers 74 and 75 carried with the former mount the cams 72 and 73 and close the clutch into complete engagement, the further advance, past the 55° position, being resisted by the action of the curved flanges 21 and 31 on the driving rollers 19 and 29. Meanwhile the high gear clutch opens completely.

Thus all clutch engagements occur immediately after the synchronization of their parts, and owing to the wedge action slip under load is practically impossible, so that there is a minimum of wear and tear and of shock. When either of the high or second gear clutches is engaged the wedge cams on the clutch plates force the clutch rollers (see chart) farther apart so that there is considerable clearance between the plates of the other clutch.

In the discussion of the change from second to high gear it was shown how the rollers were held at about the 30° position during the change, with both clutches slipping under reduced pressure. If the plates for this position are not in actual contact the change would still be actuated though not with such sureness and smoothness.

Suppose that when the rollers are between the 33° and 27° position both clutches are not quite in contact. The floating member and the driving plates will oscillate between these positions as long as the speed of the drive shaft is between that of the clutch plates 61 and 105. If (see chart) it is moving faster it will receive a backward pull from the high gear plate 105 and if slower a forward pull from the second gear plate 61. When it reaches the speed of either plate the corresponding cams will be forced between the rollers and the clutch engaged.

Now as the rollers 19 are not entirely free from friction and as the centrifugal force of the weights may be very great, the drive shaft and floating member may occasionally tend to stick for an instant with the rollers between the 33° and 27° positions. If this occurs at the instant of synchronization for either of the clutches the engagement may not instantly follow the synchronization.

These periods of sticking would be rare and of very brief duration because the floating member has some inertia and the drive shaft, and rollers 19 are subject to frequent positive accelerations due to the impulses from the engine, the frequent small oscillations of the rollers tending to prevent sticking.

If it is desired to avoid the slipping contact of these inserts and at the same time to remove all possibility of the drive shaft over-shooting the mark after synchronization, a trigger device can be used to catch the floating member at the instant of synchronization and hold it to the speed of the corresponding driven part so that the clutch rollers will mount the cams and close the clutch.

A relatively simple form of such device for the second gear clutch is shown in Figs. 7 and 8 and its position indicated in Fig. 1. It is shown as it would be when the low gear is in operation. Two rings 111 and 112 carried between the gear 59 and disc 66, are connected by spokes 113 and carry rollers 114 whose pins 115 are inserted in the rings. Part of the ring 112 projects into a groove 111$^x$ cut around the hub 59$^x$ of the gear 59, in which are light springs 116 pressing the rings to the left and the rollers gently on the face of the gear 59.

Figure 5:
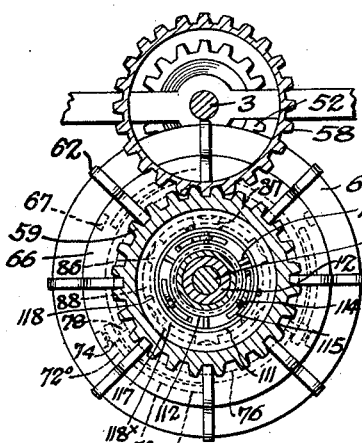
Fig. 5 is a sectional view on line 5—5 Fig. 1.
Figure 3:
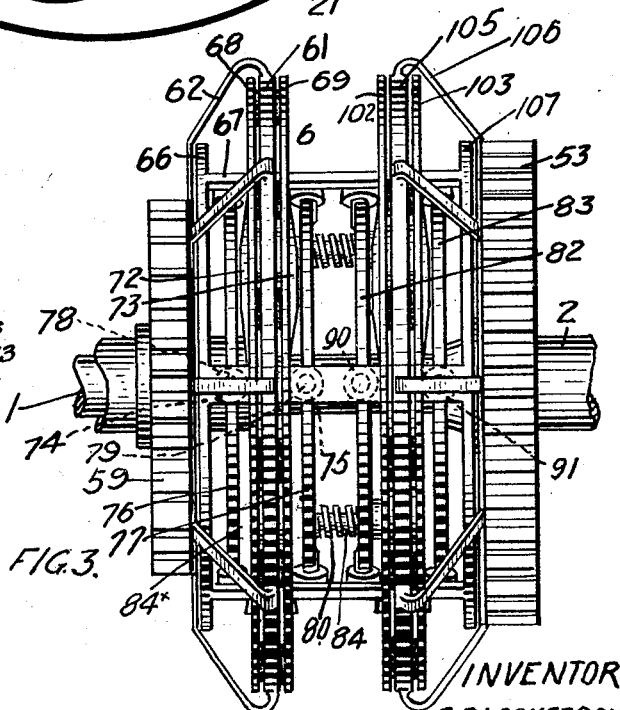
Fig. 3 is a plan view of the intermediate and high gear clutch mechanism separated from the rest of the machine.

There is thus perpetual light slipping contact of the springs between the ring and the hub 59$^x$; the rollers roll over the face of the gear 59, they and the rings moving with the disc 66, the studs 117 on the ring 111 being free to move only between the studs 118 and 118$^x$ (in Fig. 5) on the disc 66. (The mechanism of the low gear clutch is now unchanged except that the springs 46 need now only be strong enough to ensure contact when required so that the clutch cones will jam when the driving cone overtakes the driven cone.)

Strong bent springs 119 are secured to the disc 66.

When, on changing from low to second gear, the drive shaft falls below the speed of the members 59 and 61, the floating member cannot, for the rollers 114 will jam between the face of 59 and the bent spring 119, the latter now being overtaken by the former (see Fig. 8, and direction of arrow). Hence the floating member including the disc 66 is held to the speed of the driven parts 59 and 61 while the drive shaft falls behind, the rollers including 74 and 75 moving to left in the chart and effecting the full engagement of the clutch 61, 68 and 69.

During the change to high gear after the release of the clutch 61, 68 and 69 by the drag of the engine the rollers 114 are forced past the bent spring 119 (downward in Fig. 8) when the retardation of the drive shaft brings the clutch rollers 90 and 91 backward to the cams 100 and 101, since this action causes the plates 102 and 103 to pinch the plate 105 thus giving the floating member system a sharp backward pull, (the spring 119 yielding because it is strong enough only to cause by jamming a temporary halting of the floating member as described above). The roller 114 then assumes the position shown by the dotted circle in Fig. 8, and is ready to act in a similar manner when the drive passes to the second from the high gear.

If the roller 114 is in the dotted line position when the second gear clutch is released by overload it will tend to lock the floating member including the disc 66 to the disc 60, i. e. to prevent the advance of the floating member part 66, then the drive shaft and rollers 19 and 29 will advance and catch the inwardly turned parts of the flanges 21 and 31 and force forward the floating member, including the disc 66, the roller 114 moving backward or up in Fig. 8, compressing the spring 119 and returning to its original position allowing the disc 66 to advance with respect to the disc 60.

For the high gear clutch a similar device between the discs 107, part of the floating member, and gear 53 secured to the driven shaft, is indicated by the roller 125, the rings 126 and 127 and springs 128. Collars 129 and 130 shown in Fig. 1 serve to take the axial thrust when the rollers 114 or 125 are jammed; as this occurs only when related parts are synchronized, there is no need for thrust bearings.

The foregoing devices then are simply catches to halt the floating member and driving plates while the clutch rollers 74, 75, 90 and 91 carried by the drive shaft, run on to the appropriate wedge cams to close the proper clutch. The bent springs 119 and 128 have only to overcome the tendency of the driving rollers 19 to stick; they do not have to withstand the resistance of the clutch springs 80 and 81 to compression but only that of the very weak springs 96 and 104.

There is some economy and simplicity in using the same springs for both high and intermediate gear clutches; if so desired the low gear clutch too can be worked with the same mechanism; it would be like the high gear one reversed, that is its representation on the chart would be like the mirror image of C, the wedge cams being at the right hand end. It would be releasable only by drag of the engine.

The reason for showing the clutches in the positions as in Fig. 1, is that when the drive is direct the idling parts of the second and low gear trains are not subject to excessive speeds. From the sizes of the gears in Fig. 1, it follows that no part would be idling at more than twice the shaft speed; if the low gear clutch were about the drive shaft its driven part would idle at four times the speed of the shafts.

The clutches could be carried about the driven shaft, in which case the idling speeds would be still further reduced, but then they would be subject to greater torque, the low gear one having to stand four times the maximum torque of the engine and the second gear one twice. Where it is the low gear clutch has to stand twice the engine torque and that is why it is of the jamming type not requiring specially strong springs.

Further economy of strong springs can be effected by using the clutch springs themselves to do the work of the springs 30.

Figure 2:
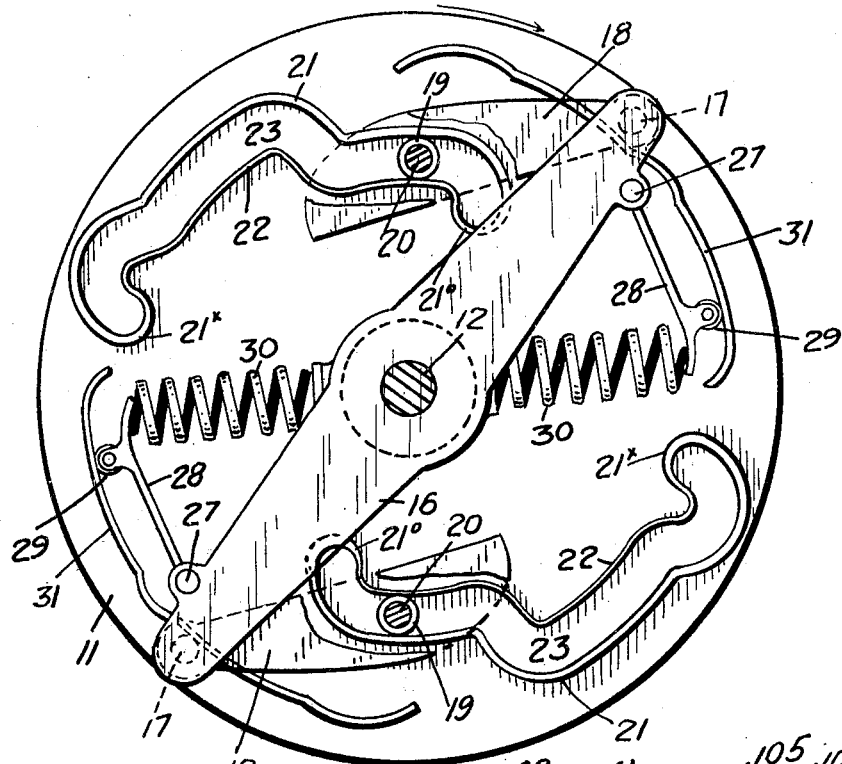
Fig. 2 is a face view of the floating disc and the parts directly connected thereto showing the driving shaft in section.

Referring to Fig. 2, and the chart it can be seen that the bowed parts of the flanges 31, in which the spring rollers 29 act, are at the same positions (as regards angular displacement) as the parallel surfaces of the wedge cams 72, 73, 100 and 101. Consequently, if the latter are cut as indicated by the curved broken lines, the clutches and rollers 74, 75, 90 and 91, acting in these curves will produce the same effect as do the spring pressed rollers 29 which may then be dispensed with.

The clutch springs are strong enough to hold against the greatest torque the engine can exert and this implies a normal pressure great as compared with the tangential thrust at the radial distance of the rollers 74 etc. Hence the angles between the cam surfaces and the plane of the plates are comparatively small.

For neutral the drive shaft may be disconnected from the main clutch shaft, not shown, or the splined gear 52 may be moved manually to the right clear of the gear 53. This would break the low and intermediate gear trains. If the high gear clutch is engaged, it can be released by applying the brakes with the car at rest, there being no centrifugal force to resist the release when the main clutch is let in, the springs 30 being preferably not too strong so that they can be compressed to allow the release without offering sufficient resistance to cause undue wear on the main clutch.

For reversing, the gear 52 is moved clear of the gear 53. Then the gear 136 (which can slide on the shaft 137 between the supports 138 and 139 in Fig. 1ª) is moved to the left to mash with 52 and 53 at once. This reverses the direct drive.

The springs 30 serve the purposes of resisting the release by drag of the second gear clutch (so that it is not continually being released in very slow traffic, not until the driver desires) and of reinforcing the centrifugal action of the weights 18 resisting the overload release of high and second gear clutches and also helping to check the relative forward or backward swing of the drive shaft with respect to the floating member.

The use in reinforcing the centrifugal action of the weights is not occasioned by any difficulty in obtaining enough centrifugal force from the weights alone but to the fact that this action varies very much with speed, so that a much greater load or torque is required to effect the overload release at higher speeds than at lower. The use of spring force practically independent of speed gives the designer greater facility in combining moderate resistance at lower speeds with not too great resistance at higher speeds. If the springs act outward as they are shown in Figs. 1 and 2, the effect will increase slightly with speed, if axially or if the arms 28 are counterbalanced it will be quite independent of speed, and if they act inward the effect will decrease slightly with speed.

The chief function of these springs is to supplement the centrifugal action of the weights at low speeds and with light load (when the centrifugal force is small) so that the car will operate in high gear while the throttle is only partly open but will change to second gear if the throttle is suddenly opened to obtain rapid acceleration.

If the springs are very strong the weights may be lighter but the resistance they offer might cause the car to start in high gear or cause undue wear on the main clutch when starting unless manual means are provided for compressing them.

Since the centrifugal force of the weights increases with the square of the speeds while the maximum torque exertable by the engine does not, there must be a speed above which the engine cannot exert sufficient torque to effect the change to lower gear. This speed can be fixed approximately by the designer. It will be much lower, on account of the greater relative speed of the drive shaft, for the intermediate gear than for the high, and also in the design shown in Fig. 2, because the inward bend of the flange 21 is much greater (steeper and more extended) at the second gear position at 55° than at the high gear position 17°. There is, generally speaking, no need to change from second to low gear except at very low speed with great load. This steeper and more extended inward curve at the second gear position also acts to minimize the chance of the rollers 19 over-shooting the mark on the change down to second gear and letting the drive pass right on to the low gear.

The application to a two speed machine is illustrated in Figs. 11 to 16 inclusive to which I will now refer.

The two speed machine consists of a planetary gear unit with clutches for locking the reaction member, carrying the internal reaction gear ring, to the drive shaft for direct drive, or to the stationary member for low gear.

101 is the drive shaft, 102 the driven shaft, the reaction member consists of the disc or spoke member 160 carried freely on the drive shaft and similar member 161 so carried on the driven shaft and the internal ring gear 162 secured to both 160 and 161.

Secured to the drive shaft is a gear 163 between which and the gear 162 are the planet gears 164 carried on a disc or arms 165 secured to the driven shaft, so that when the drive shaft and reaction member are locked together the driven shaft also is.

Figure 13:
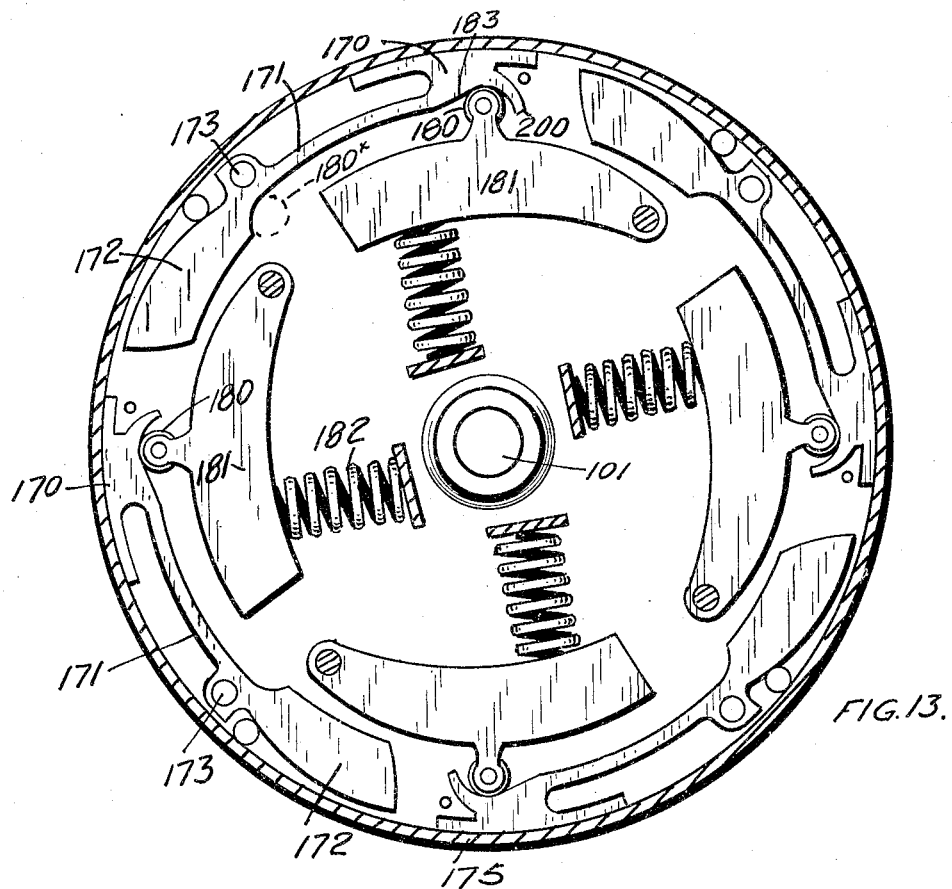
Figure 14:
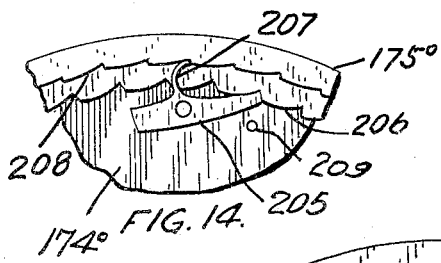

Fig. 13 shows a front view of the direct drive clutch parts with two of the disc members (see 174 and 176 below) removed.

Brake shoes 170 on arms 171 balanced by extensions 172 are pivotally carried on studs 173 on the disc 174 (freely mounted in any way), the disc and shoes corresponding to the floating member of the other machine.

These shoes engage a drum 175 secured to the drive shaft by disc or spokes 176. The shoes are pressed outward by rollers 180 on the weights 181 pivotally carried on the reaction member 160; the outward pressure being due to the centrifugal force of the weights 181 and the springs 182 secured to the disc 160. The advance of the shoes with respect to the rollers is resisted by the inwardly curved parts 183 of the inner surface of the shoes or arms 171 which is inclined inward at such an angle that the shoes do not slip on the drum 175. Thus the drive shaft, reaction member and driven shaft all revolve together, there being no slipping contact and no internal motion as will be seen below.

When the load becomes excessive the shoes 170 do not slip but the weights 181 are forced inward against spring and centrifugal force. As the drive shaft and shoes advance the rollers 180 run along the arms 171 to the position marked 180ˣ which is slightly backward of (to the left in Fig. 13) the line joining the pivot point of 173 to the centre of the drive shaft; the shoe members are then lifted clear of the drum against the studs 184 on the disc 174.

In this way the direct drive connection is released by overload. As the engine races the reaction member loses speed and when it comes to rest it is held from reverse rotation by the reaction clutch which is shown in Fig. 12, a rear view.

190 are brake shoes pivotally carried on arms 191 secured to the freely mounted hub or ring 192, by which means the shoes are spaced and retained. Each shoe has a slot 193 moderately inclined toward the tangential in which works a roller 194 carried on the reaction member 161. While they are in motion the shoes are by centrifugal action held clear of the adjacent stationary drum 195.

Under the rapid negative acceleration which follows the release of the high gear clutch the shoes 190, etc., tend to fly onward (in the direction of arrow) the tendency being augmented by the weak springs 196 secured to the disc 161 and pressing the arms forward. As the speed of the reaction member approaches zero and centrifugal force ceases to act the shoes will be in contact with the fixed drum 195, so when the back thrust comes they will jam between it and the rollers 194 holding the reaction member against reverse rotation. The drive will then commence through the low gear train without shock.

The change to high gear is effected by slowing the engine; this has the effect of starting the reaction member forward, the thrust of the rollers 194 in the slots 193 releases the shoes 190 and shortly the centrifugal action lifts them quite clear of the drum. In doing so it must work the arms 191 slightly backward against the springs 196, so these springs are made strong enough only to ensure contact of shoe and drum when the machine is at rest without load to be ready to act when power is applied.

When the reaction member begins to revolve forward the floating member (shoes 170, 172, etc., of the high gear clutch Fig. 13) revolves also. If it hesitates the pressure members 180 run along the arms 171 pressing the shoes on the forward moving drum. The balance of the shoe arms is not perfect, the shoe ends being a little heavier, so a rubbing contact under light pressure on account of the (incomplete) balancing effect, is kept up by centrifugal action of the unbalanced portions of the shoes. The forward rubbing of the drum causes the pressure members to act at or very near the pivots of the shoes until the drum is overtaken by the reaction member.

When the reaction member overtakes the drive shaft the rollers 180 run forward on the arms 171 and outward on the inclined surface 183 to be caught by the spur 200 on the shoe. When the throttle is reopened the direct drive is resumed.

The weights 181 and springs 182 need not be as heavy and strong as might at first sight seem necessary; the centre of gravity of the weight and point of application of the spring can be made much farther from the pivot of the weight than the roller 180 and it should be noted that all the load is not transmitted by the direct drive clutch. With the relative dimensions shown for the gears about 40 per cent. or 45 per cent. of the torque is delivered directly by the gear 163.

For surer action during engagement of the direct drive clutch small free rollers 201 may be carried between the arm 172 and the drum 175, where the former is inclined toward the latter. These by their jamming action prevent the shoes from attaining greater speed than the drum or drive shaft; as the drive shaft is overtaken by the reaction member they jam, holding the shoes while the reaction member, including the rollers 180 advances. Then the rollers 180 move forward as before into the driving position.

Figure 15:
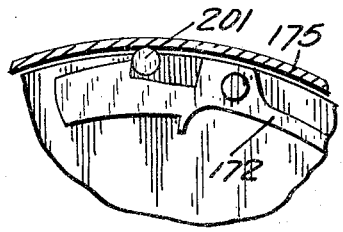

When the reaction member is at rest or revolving more slowly than the drum 175 or drive shaft the free rollers roll idly. If the notch 202 in which the roller 201 works is shaped as shown in Fig. 15 the roller will jam only when the shoe is off the drum. As the shoe moves outward into engagement the arm 172 moves inward freeing the roller.

Figure 16:
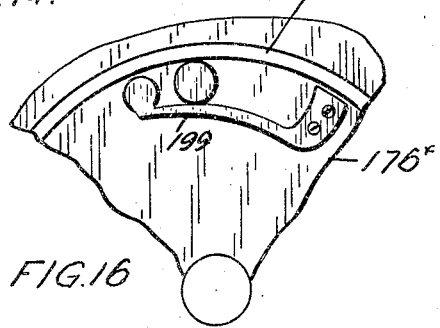

In Fig. 16 the roller works between the drums $175^x$ secured to the drive shaft or disc $176^x$ and a strong spring 199 secured to the disc $174^x$, the roller being retained by a stud 203 and $174^x$ and the secured part of the spring 199; the action is the same as before. These two figures show means of preventing the positive jamming of the rollers, all that is required being a momentary check to the brake shoe members.

The machine may be used with a specially designed gear box in conjunction with manually operated gears, including a reverse and, optionally, two forward speeds, it being placed between the engine and the manually operated gear system. Or it may be fitted to the rear of an ordinary gear box. In either case practically all the driving can be done with the gear shift lever in the high speed position.

In order to allow for reverse drive when the device is added to the rear of the gear box the "stationary" drum 195 is made releasable to permit reverse rotation. The carrier 204 which bears the drum may be mounted on any suitable form of bearing and have releasable keys which are withdrawn when the reverse gear is in use. The reverse drive will be direct through the device either by providing means for jamming the direct drive clutch like the rollers 201 in Fig. 13, or by the use of the contrivance shown in Fig. 14.

205 is a dog carried on the member $174^o$ (the member which carries the shoes 170, etc.)

and 206 a rack integral with the drum 175°. 207 is a light pawl forming a trip in the form of a weak spring, attached to the dog and engaging a fine rack 208 integral with 206.

When the reaction and floating members are at rest the spring pawl 207 slips noiselessly over the rack 208 and holds the dog 205 off its rack 206 against the stud 209 on the disc 174°; thus the relatively heavy dog 205 cannot clatter. When the disc 174° overtakes the drum 175° and the racks, the pawl 207 turns the dog 205 into engagement with the rack 206, thereby checking the disc 174° and the shoes 170, etc., just as did the ball rollers 201, which may be dispensed with. When the drive shaft is revolved backward the disc 174° carrying the parts shown in Fig. 14 (dog, etc.) becomes locked to the rack 206 which is secured to the drive shaft; thus the shoe members 170, etc., revolve backward and the weight rollers 180 are caught by the spur 200 which may be curved inward and around to hook the roller 180.

The drive is now, from drive shaft—drum 175—integral rack 206—dog 205—disc 174—shoe members 171 and 170—spurs 200—rollers 180—weights 181—reaction member 160 which carries the weights. The reaction member is thus locked to the drive shaft and the drive is direct, the necessary reduction being done in the ordinary reverse gear. In the reverse drive the shoes act merely as links, not as friction clutch members.

These two machines illustrate how releasable couplings of the friction clutch type can be used to replace the dog, key or spline type previously described. These clutches are adapted not to slip under load and to engage immediately upon synchronization of their parts so that there is a minimum of wear and tear and of lurch or shock.

Means have been described for actuation of clutch members having radial or axial motion and for their use with different types of gear trains. It has also been shown how a clutch can be made releasable by overload or by drag and reengage after either kind of release.

Methods have been described for modifying the centrifugal action of the weights by spring action, such modification not being necessary as a matter of principle but being introduced as a convenience for the designer.

What I claim as my invention is:

1. In a change gear device of the type described, the combination with a drive and driven shaft, a plurality of gear trains therebetween, and means actuated by overload counter-acting centrifugal action for changing the drive from a higher to a lower gear train and by engine drag for changing from a lower to a higher gear train, of a friction clutch incorporated in a gear train having opposing friction members, and a catch device carried between such members to actuate their engagement on synchronization.

2. In a change gear device of the type described, the combination with a drive and a driven shaft, interchangeable gear trains therebetween and a secondary floating driving member incorporated in the transmission, of a clutch for closing one of the gear trains comprising opposing friction members one of which is connected to the floating member, a catch device located between the floating member and the other of the friction members for checking the relative motion of the two parts on synchronization, and means actuated by such checking for closing the clutch.

3. In a change gear device of the type described, the combination with a drive and a driven shaft, a plurality of gear trains therebetween, and means actuated by overload counteracting centrifugal action for changing the drive from a higher to a lower gear and actuated by engine drag for changing from a lower to a higher gear, of a unidirectional clutch for transmitting the drive through the low gear train and having opposing friction members, means coacting with the opening of a higher gear train for bringing the friction members into contact before synchronization, a wedging device to jam them into positive driving engagement on synchronization and to release them from such engagement effected by backward drag on the drive shaft and means coacting with the change to higher gear for definitely separating the friction members after the release.

4. In a change gear device of the type described, the combination with the drive and driven shaft, and a low gear train and a higher gear train therebetween, means for releasing the higher gear train actuated by overload, of a clutch device incorporated in the low gear train having opposing friction members one of which is carried in a part of the gear train which is accelerated by the acceleration of the engine resulting from overload release of the higher gear train, such friction member being so mounted that its inertia acts to bring it into contact with the other friction member before synchronization.

5. In a change gear device, the combination with a drive and a driven shaft, and a plurality of gear trains varying in gear ratio therebetween, of a friction clutch incorporated in the intermediate gear train having opposing friction members, weights so carried on the device as to be subject to centrifugal force and to inward force due to load, means actuated by the inward movement of the weights when influenced by overload for releasing the clutch to allow of relatively increased speed of the drive shaft, means actuated by backward drag on the drive shaft for releasing the clutch to allow of relatively decreased speed of the drive shaft the clutch being re-engageable as the opposing friction members thereof synchronize.

6. In a change gear device of the type described, the combination with a drive and driven shaft and a plurality of interchangeable gear trains therebetween, of a clutch incorporated in the intermediate gear train having opposing friction members, means actuated by overload counteracting centrifugal action for releasing the clutch to allow relatively increased drive shaft speed and by engine drag for releasing the clutch to allow of decreased drive shaft speed, means for definitely separating the clutch members when released and coacting with the change to another gear train, a catch device carried between the friction members adapted to check their relative motion when one overtakes the other, and mechanism actuated by said checking for effecting the engagement of the clutch.

7. In a change gear device of the type described, the combination with a drive and driven shaft, and a plurality of interchangeable gear trains therebetween, of a clutch incorporated in the intermediate gear train having opposing friction members, a mechanism actuated by overload counteracting centrifugal force for releasing the clutch to allow relatively increased drive shaft speed and actuated by engine drag to release to allow of decreased drive shaft speed, and means actuated by turning moment on the drive shaft in either direction for effecting re-engagement and comprising pressure members for forcing the clutch members into contact, means ensuring contact of the pressure members when one overtakes the other, and a clutch pressure mechanism including a resilient pressure member and a wedging device acting to force the contacting friction members into engagement under pressure of the pressure member.

8. In a change gear device of the type described, the combination with a drive and driven shaft and a plurality of interchangeable gear trains therebetween, of a clutch in the high gear train having opposing friction members, weights incorporated in the transmission and so carried as to be subject to centrifugal force and inward force due to load, and means actuated by the inward movement of the weights when influenced by overload for releasing the clutch, the clutch being re-engageable when said friction members are synchronized.

9. In a change gear device of the type described, the combination with a drive and driven shaft, and a plurality of interchangeable gear trains therebetween, of a clutch between the shafts including driving and driven friction members adapted when engaged to lock the shafts together, means actuated by overload counteracting centrifugal action for releasing the clutch, means actuated by drag on the drive shaft for effecting its re-engagement comprising means ensuring contact of the friction members when one overtakes the other, and clutch pressure mechanism including a resilient pressure member and a wedging device acting to force the contacting friction members into positive driving engagement under pressure of the pressure member without causing them to slip and allowing their release without slip under such pressure.

10. In a change gear device of the type described, the combination with the drive and driven shafts, and a plurality of interchangeable gear trains therebetween, of a clutch incorporated in the high gear train having opposing friction members, means actuated by overload counteracting centrifugal action for releasing the clutch, means for definitely separating the clutch members when released, mechanism for effecting the re-engagement of the clutch actuated by retardation of the drive shaft, and comprising a catch device carried between the said friction members adapted to check their relative motion on synchronization and means actuated by such checking for effecting the engagement of the clutch.

11. In a change gear device, the combination with drive and driven shafts and a plurality of gear trains between, of a floating member carried with one of said shafts having an arc of displacement therewith and adapted to engage it at a plurality of driving positions spaced apart in said arc to transmit the drive selectively through different gear trains, friction clutches each having opposing friction faces connected respectively with the floating member and a different one of the gear trains and each associated with a different driving position of the floating member, a clutch operating mechanism controlled by floating member movement between the driving positions adapted to release and engage the clutches and including wedging means to prevent their slip under load, and adapted to change from a lower to a higher train as the floating member moves one way owing to retardation of the drive shaft and from a higher to a lower as it moves the other way owing to the advance thereof, the operating mechanism being adapted to effect the engagement of a clutch as the faces thereof are synchronized.

12. In an automatic friction clutch device, the combination with driving and driven main parts, a floating member carried with an adjacent one of said main parts and adapted to move across an arc of displacement therewith between a drive and a release position and friction clutch parts between the floating member and the other main part, of means for locking the floating member in the drive position to transmit torque and for unlocking it to allow the advance of the main driving part to carry it freely to the release position, a clutch pressure mechanism operated by displacement of the floating member adapted to release the clutch parts as the unlocked floating member moves substantially without resistance to the release position and to effect their reengagement as it returns to the drive position, and means actuated by synchronization of the said main parts and retardation of the main driving part for returning the floating member to the driving position.

13. In an automatic friction clutch device, the combination with driving and driven main parts, a floating member carried with one of these main parts and adapted to move across an arc of displacement therewith between a drive and a release position and friction clutch parts between it and the other main part, of means for locking the floating member in the drive position to transmit torque and for unlocking it to allow the advance of the main driving part to carry it to the release position, means actuated by synchronization of the clutch parts and retardation of the main driving part for returning the floating member to the drive position, and a clutch pressure mechanism operated by displacement of the floating member adapted to release the clutch parts as it moves to the release position and to re-engage them as it moves to the drive position including wedging means adapted to effect such release and engagement without slip under load.

14. In an automatic friction clutch device, the combination with main driving and driven parts, of a floating member carried with one of these main parts having an arc of displacement therewith being adapted to engage it at a driving position near the centre of said arc, means for locking the floating member at its driving position to transmit the drive and for unlocking it to be carried from the drive position toward one end of the arc by advance of the driving part and toward the other end by retardation thereof, friction clutch parts between the floating member and the main part other than that with which it is carried, a clutch operating mechanism controlled by displacement of the floating member adapted to release the clutch parts as it moves from the drive position toward either end of the arc and to reengage them as it moves toward the driving position, and including wedging means for effecting such release and engagement without slip under load, and means actuated by the undertaking of either main part by the other for moving the floating member to the driving position.

GIBBS BLACKSTOCK.